US011919223B2

(12) United States Patent
Garcia et al.

(10) Patent No.: US 11,919,223 B2
(45) Date of Patent: Mar. 5, 2024

(54) METHODS OF FORMING A MANDREL FOR FORMING COMPOSITE STRUCTURES, METHODS OF FORMING COMPOSITE STRUCTURES, AND RELATED TOOLS

(71) Applicant: Northrop Grumman Systems Corporation, Falls Church, VA (US)

(72) Inventors: Benjamin W. Garcia, Tremonton, UT (US); Jacob M. Ketcham, North Salt Lake, UT (US); Jared S. Noorda, Mountain Green, UT (US); Carl B. Madsen, Park City, UT (US); David R. Machac, Ogden, UT (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 17/710,255

(22) Filed: Mar. 31, 2022

(65) Prior Publication Data

US 2022/0314528 A1    Oct. 6, 2022

Related U.S. Application Data

(60) Provisional application No. 63/169,662, filed on Apr. 1, 2021.

(51) Int. Cl.
  B29C 53/82        (2006.01)
  B29C 53/60        (2006.01)
  (Continued)

(52) U.S. Cl.
  CPC .......... B29C 53/824 (2013.01); B29C 53/602 (2013.01); B29C 64/118 (2017.08);
  (Continued)

(58) Field of Classification Search
  None
  See application file for complete search history.

(56) References Cited

U.S. PATENT DOCUMENTS

| 5,266,137 A  | 11/1993 | Hollingsworth |
| 10,994,447 B2 | 5/2021 | Sana |

(Continued)

FOREIGN PATENT DOCUMENTS

| CN | 111 619 097 A | * | 9/2020 |
| CN | 111619097 A   |   | 9/2020 |

(Continued)

OTHER PUBLICATIONS

International Search Report for International Application No. PCT/US2022/023051, dated Jul. 4, 2022, 12 pages.

(Continued)

*Primary Examiner* — Mohammad M Ameen
(74) *Attorney, Agent, or Firm* — TraskBritt

(57) ABSTRACT

A tool for forming a composite structure may include two or more segments formed from a polymer material. The tool may further include a crush insert disposed between the two or more segments. The tool may also include a support shaft coupled between the two or more segments. A method of forming a mandrel may include forming segments of the mandrel through an additive manufacturing process. The method may further include assembling the segments relative to one another. The method may also include positioning a crush insert between each of the segments. A method of fabricating a composite structure is also disclosed.

18 Claims, 6 Drawing Sheets

(51) Int. Cl.
    *B29C 64/118*     (2017.01)
    *B29C 70/86*     (2006.01)
    *B33Y 10/00*     (2015.01)
    *B33Y 70/00*     (2020.01)
    *B33Y 80/00*     (2015.01)
    *B29K 705/02*     (2006.01)
    *B29L 31/00*     (2006.01)

(52) U.S. Cl.
    CPC .............. *B29C 70/86* (2013.01); *B33Y 10/00* (2014.12); *B33Y 70/00* (2014.12); *B33Y 80/00* (2014.12); *B29K 2705/02* (2013.01); *B29K 2879/085* (2013.01); *B29L 2031/757* (2013.01)

(56) References Cited

U.S. PATENT DOCUMENTS

2010/0032862 A1*   2/2010   Micheaux ............. B29C 70/446
                                                           264/219
2018/0065277 A1*   3/2018   Bremmer ............ B29C 33/3842

FOREIGN PATENT DOCUMENTS

| EP | 2083980 A1 | 8/2009 |
| WO | 2009/083531 A1 | 7/2009 |

OTHER PUBLICATIONS

International Written Opinion for International Application No. PCT/US2022/023051, dated Jul. 4, 2022, 12 pages.

\* cited by examiner

METHODS OF FORMING A MANDREL FOR FORMING COMPOSITE STRUCTURES, METHODS OF FORMING COMPOSITE STRUCTURES, AND RELATED TOOLS

CROSS-REFERENCE TO RELATED APPLICATION

This application claims the benefit under 35 U.S.C. § 119(e) of U.S. Provisional Patent Application Ser. No. 63/169,662, filed Apr. 1, 2021, the disclosure of which is hereby incorporated herein in its entirety by this reference.

TECHNICAL FIELD

Embodiments of the present disclosure generally relate to methods of forming composite structures. In particular, embodiments of the present disclosure relate to methods of forming composite structures and the associated tooling and systems.

BACKGROUND

Hard surfaced mandrels may be used to assemble layers of insulating rubber and composite material when forming composite structures. The mandrel may support the insulation, composite membrane material, and skirt material during a winding process in which filaments of a fiber that will form the composite are wound around the insulation, composite membrane material, skirt material, and mandrel. The mandrel also remains rigid during the curing of the rubber and composite materials. During a cure process, heat and pressure are imposed on the composite structure and the mandrel, as the rubber and composite materials solidify. After cure, the mandrel is removed from the composite structure leaving a cavity where the mandrel was positioned. Therefore, the mandrel should be formed in a manner that enables the mandrel to be removed without causing any damage or deformation to the inner rubber or composite material.

BRIEF SUMMARY

Embodiments of the present disclosure may include a method of forming a mandrel for forming a composite structure. The method may include forming segments of the mandrel through an additive manufacturing process. The method may further include assembling the segments relative to one another. The method may also include positioning a crush insert between adjacent segments.

Another embodiment of the present disclosure may include a tool for forming a composite structure. The tool may include two or more segments formed from a polymer material. The tool may further include a crush insert disposed between the two or more segments. The tool may also include a support shaft coupled between the two or more segments.

Another embodiment of the present disclosure may include a method of fabricating a composite structure. The method may include assembling a mandrel. Assembling the mandrel may include forming segments of the mandrel through an additive manufacturing process. Assembling the mandrel may further include assembling the segments relative to one another. Assembling the mandrel may also include positioning a crush insert between each of the segments. Assembling the mandrel may further include coupling the segments to a support shaft. The method of fabricating the composite structure may further include coupling the support shaft to a winding machine. The method may also include winding composite fibers around the mandrel to form the composite structure. The method may further include heating the composite structure. The method may also include separating the mandrel from the composite structure.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

Figure 1:
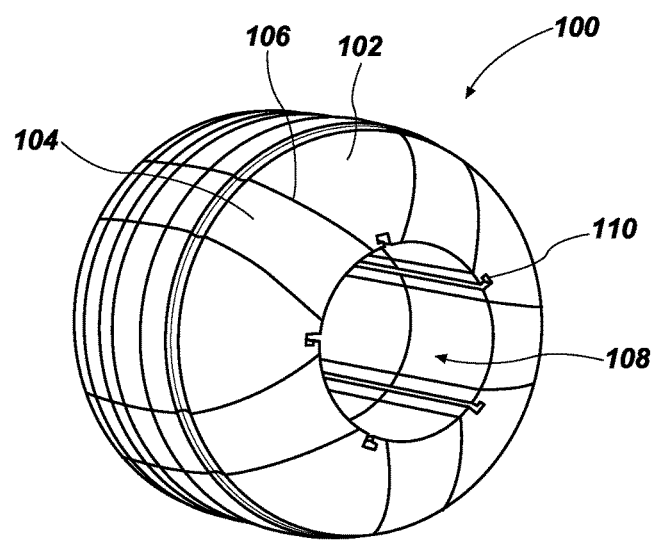
FIG. 1 illustrates a perspective view of a mandrel in accordance with embodiments of the present disclosure.

The illustrations presented herein are not meant to be actual views of any particular tool for fabricating composite structures or component thereof, but are merely idealized representations employed to describe illustrative embodiments. The drawings are not necessarily to scale.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even at least about 100% met.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

Large hollow composite structures, such as pressure vessels, rocket motors, etc., may be formed over hard surface mandrels to define a hollow cavity within the composite structures. The hard surfaced mandrel may be used to assemble layers of insulating rubber and composite material into a desired shape. The mandrel may serve many functions, such as supporting an insulation, a composite membrane material, and a skirt material during a winding process. The mandrel also remains rigid during the curing of the insulating rubber and composite materials. During the cure process, heat and pressure are imposed on (e.g., applied to) the mandrel as the insulating rubber and composite materials solidify. After cure, the mandrel is removed from the resulting composite structure. Therefore, the mandrel should be formed in a manner that enables the mandrel to be removed without causing any substantial damage or deformation to the inner insulating rubber or composite material. The thermal expansion of the mandrel during the cure process is one factor that may determine an inner geometry of the composite structure. Typically, materials that are stiff and have a low thermal expansion are desirable for mandrels as those materials exhibit predictable properties under loading.

Mandrels may be formed from metal materials, such as steel. Steel provides high strength, high stiffness, and low thermal expansion. Steel is also robust and less susceptible to wear when compared to other materials. However, steel mandrels may be heavy and expensive to produce. In some instances, a steel mandrel may take months, if not years, to design, procure, and implement. Furthermore, steel mandrels may have a complicated assembly and removal processes.

Another material that may be used to form mandrels is plaster, such as Plaster of Paris. When cured, plaster may be rigid and have a low thermal expansion. Plaster material may be inexpensive and relatively easy to acquire. However, plaster requires a stiff framework for support. This framework may be formed from a metal material, such as steel. The framework may be designed to prevent the plaster from cracking during winding and curing. Forming a mandrel from plaster may require a substantial amount of time to apply the plaster to the framework. Furthermore, plaster may be fragile and easy to damage, which may result in additional losses and expenses due to damaged mandrels. The application of the plaster onto the underlying framework may take weeks. After winding and curing, the plaster may then be removed from the composite structure by allowing water to soften the plaster and then chipping away the plaster from inside the composite structure.

Silica sand may also be used to fabricate a mandrel. The silica sand may be formed in an outer mold to form the sand in the desired shape. After the sand has hardened, it may be removed from the mold and processed for winding. Similar to plaster, the silica sand mandrel may be fragile and easy to damage. Therefore, care must be taken to not crack the silica sand during winding. After winding and cure, the silica sand is washed out of the inside the composite structure using water.

Forming a reusable mandrel from a low cost, robust rigid material that may be easily assembled and disassembled may reduce the cost of forming composite structures, such as pressure vessels, rocket motors, etc. Furthermore, a reusable mandrel that may be procured in a short period of time may encourage innovation by enabling design changes to be implemented and/or tested without extensive lead times and expenses to make the changes to the mandrels.

FIG. 1 illustrates an embodiment of a mandrel 100 according to embodiments of the disclosure. The mandrel 100 may be formed from multiple segments, such as wedge segments 102 and connecting segments 104. The wedge segments 102 and/or connecting segments 104 may be formed from a rigid material, such as a metal material, or a polymer material. The wedge segments 102 may have a general wedge-shaped cross-section, and the connecting segments 104 may be disposed between two adjacent wedge segments 102.

The material of the segments 102, 104 may be configured to be stable (e.g., rigid, not flexible) at cure temperatures of the composite materials of the associated composite structure. For example, the material may be stable at temperatures of between about 200° F. (about 93.3° C.) to about 400° F. (about 204.4° C.), such as between about 285° F. (about 140.6° C.) and about 320° F. (about 160° C.).

The segments 102, 104 may be formed through an additive manufacturing process (e.g., 3-D printing), such as fused filament fabrication (FFF), large scale additive manufacturing (LSAM), stereolithography (SLA), digital light processing (DLP), multijet fusion (MJF), polyjet, selective laser sintering (SLS), direct deposition modeling (DDM), direct metal laser sintering (DMLS), continuous carbon fiber methods, or electron beam melting (EBM). The type of additive manufacturing process may be selected based on a size of the associated segments 102, 104. For example, some additive manufacturing processes may be less expensive and more effective for producing smaller parts, whereas more expensive additive manufacturing processes may be more effective for producing larger parts. In some cases, the less expensive process may be used for some segments 102, 104 and the more expensive process may be used for the segments 102, 104 that are too large to be formed by the less expensive process. In some cases, the size and configuration of the segments 102, 104 may be determined based on the desired additive manufacturing process. For example, the mandrel 100 may be formed from a larger number of relatively small segments 102, 104 to facilitate forming the segments 102, 104 through a less expensive additive manufacturing process. In other cases, the mandrel 100 may be formed from a smaller number of relatively large segments 102, 104 to save time in assembly and disassembly of the mandrel 100. In some embodiments, the type of material used to form the segments 102, 104 may determine the type of additive manufacturing process.

In some cases, the segments 102, 104 may be formed by fusing individual layers of material on top on one another to form the segments 102, 104 in a desired shape. Forming the segments 102, 104 in layers may facilitate the customization of internal structures, such as support ribs within the associated segments 102, 104. Thus, the internal support structures may be built to provide support to the areas of each segment 102, 104, where the highest loads may be positioned during the layup and curing processes. This may also facilitate the formation of voids within the associated segments 102, 104, which may reduce the weight and material costs of the associated segments 102, 104. The surface finish may be related to a thickness of the layers. For example, forming thinner layers may result in a smoother surface finish, whereas forming thicker layers may result in a rougher surface finish. Similarly, the amount of time to form each of the segments 102, 104 may also relate to the thickness of the individual layers due to the difference in the number of passes utilized to reach a desired thickness. For example, forming the associated segments 102, 104 to a desired thickness with thinner individual layers may take a greater amount of time than forming the same segments 102, 104 to the desired thickness with thicker individual layers. As the thickness of the layers increases, more intricate features of the individual segments 102, 104 may have less definition. In some cases, a rough surface finish and/or intricate features lacking definition may be corrected through a process such as machining, sanding, polishing, etc.

The segments 102, 104 may be formed from a polymer material, such as a polyetherimide material (e.g., ULTEM®, ULTEM® 1010, and ULTEM® 9085), glass filled ULTEM® (e.g., 30% glass filled ULTEM®), carbon filled ULTEM® (e.g., 30% carbon filled ULTEM®), etc. The polymer materials may be configured to withstand curing temperatures of greater than about 320° F. (160° C.). Polymer materials may have a coefficient of thermal expansion (CTE) that is significantly greater than that of steel, plaster, or silica sand. To account for the expansion of the segments 102, 104 formed from polymer materials, joints 106 between the segments 102, 104 may include a crush insert 300 described in further detail below, with respect to FIG. 3. The crush insert 300 may enable the segments 102, 104 to expand while maintaining substantially the same outer geometry of the mandrel 100. The crush inserts 300 may be secured in the joints 106 between the segments 102, 104. For example, the crush inserts 300 may be secured through frictional interference between the joining segments 102, 104 and the crush inserts 300. In some cases, the crush inserts 300 may be secured through an adhesive, such as glue, epoxy, or tape. In some embodiments, the segments 102, 104 may include retaining geometry configured to capture and retain the crush inserts 300 during assembly of the mandrel 100. In some embodiments, the crush inserts 300 may be formed directly on the associated segments 102, 104, as described in further detail below.

In some embodiments, intricate details may be formed on the segments 102, 104, with a removable material, such as a one-time use material. For example, a soluble polymer (e.g., water soluble or mild acid soluble polymer) may be used to form intricate details on an outer surface of the associated segment 102, 104. The composite material may then be formed over the associated mandrel including the intricate detail formed from the soluble polymer. The composite material may conform to the contours of the soluble polymer. After the composite material is cured, the solution configured to dissolve the soluble polymer may be disposed between the mandrel and the composite material to dissolve the soluble polymer leaving the conformed contours formed in the composite material.

The mandrel 100 may include a bore 108 defined through a central portion of the mandrel 100. The bore 108 may be configured to couple the mandrel 100 to a support shaft 202 (FIG. 2), which may be used to secure the segments 102, 104 to one another and/or to secure the mandrel 100 to a winding tool, such as a winding machine, a winding jig, etc. The bore 108 may include one or more alignment features 110, such as key ways, channels, ridges, etc.

Figure 2:
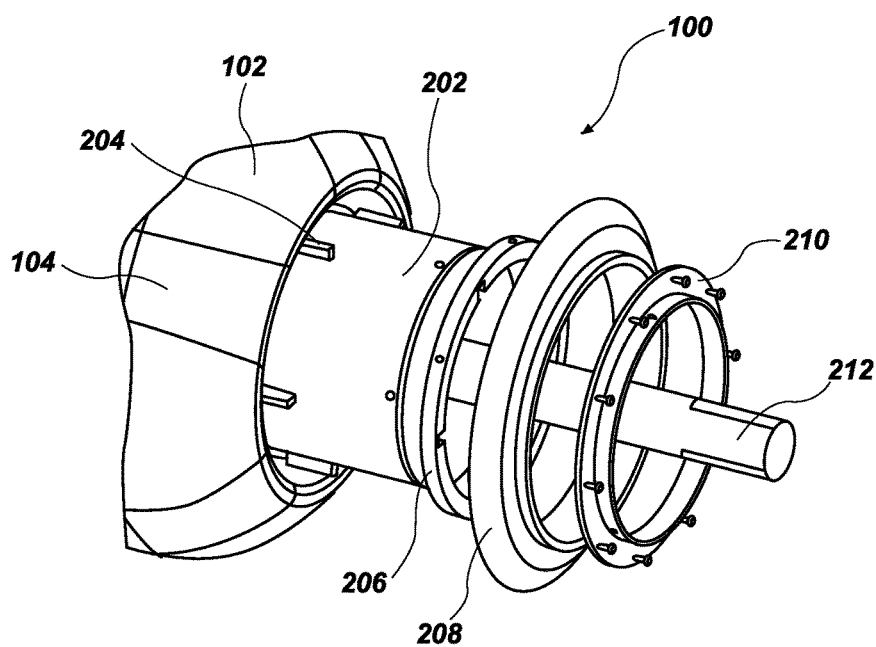
FIG. 2 illustrates a perspective view of a mandrel assembly in accordance with embodiments of the present disclosure.

FIG. 2 illustrates an exploded view of an embodiment of the mandrel 100 with the support shaft 202 disposed in the bore 108. The support shaft 202 may be formed from a rigid material having a low CTE, such as a metal material (e.g., steel).

The support shaft 202 may be configured to interface with multiple different mandrels 100. For example, the segments 102, 104 of multiple different mandrels 100 having different sizes and/or shapes, may have a substantially similar bore 108 and alignment features 110 configured to receive the same support shaft 202. As a result, a new support shaft 202 may not need to be acquired to change the design of the mandrel 100.

The support shaft 202 may include complementary alignment features 204, and the complementary alignment features 204 may be configured (e.g., sized and shaped) to interface with (e.g., be inserted into, receive, interlock with, etc.) the alignment features 110 in the bore 108. The complementary alignment features 204 may be configured to secure the segments 102, 104 both rotationally and radially. In other words, when assembled with the segments 102, 104, the complementary alignment features 204 may at least substantially prevent movement of the segments 102, 104 in rotational and radial directions relative to the support shaft 202. For example, the complementary alignment features 204 may radially secure the associated segments 102, 104 to the support shaft 202, such that the secured segments 102, 104 may secure adjacent segments 102, 104 through contact at the joints 106, such as through interference, friction, or complementary geometry in the joints 106. The complementary alignment features 204 may also rotationally secure the segments 102, 104, such that if the support shaft 202 rotates, the mandrel 100 will also rotate with the support shaft 202.

The support shaft 202 and complementary alignment features 204 may be secured to an alignment support 206. For example, the complementary alignment features 204, such as rods, dowels, etc., may be separate from the support shaft 202. The alignment support 206 may include recesses configured to receive the complementary alignment features 204 and position the complementary alignment features 204 circumferentially relative to one another. The alignment support 206 may further include features configured to secure the alignment support 206 to the support shaft 202. For example, the alignment support 206 and the support shaft 202 may include alignment holes configured to receive hardware, such as pins, screws, bolts, studs, etc.

A boss 208 may be coupled to the mandrel 100 through a boss support 210. The boss support 210 may include multiple hardware connections, such as screws, bolts, or holes configured to receive hardware, such as bolts, screws, or studs. The boss 208 may be formed through an additive manufacturing process similar to the segments 102, 104.

The support shaft 202 may be coupled to a drive shaft 212. The drive shaft 212 may be coupled to a winding tool (not shown). The winding tool may control a position, such as an angular or rotational position, of the mandrel 100 via the drive shaft 212 during a winding process. For example, the winding tool may rotate the support shaft 202 with the drive shaft 212. The rotation of the support shaft 202 may cause the mandrel 100 to rotate due to the interface between the alignment features 204, 110. The winding tool may also change an angle of the mandrel 100 relative to the winding tool by changing an angle of the drive shaft 212 and support shaft 202 relative to the winding tool.

Figure 3:
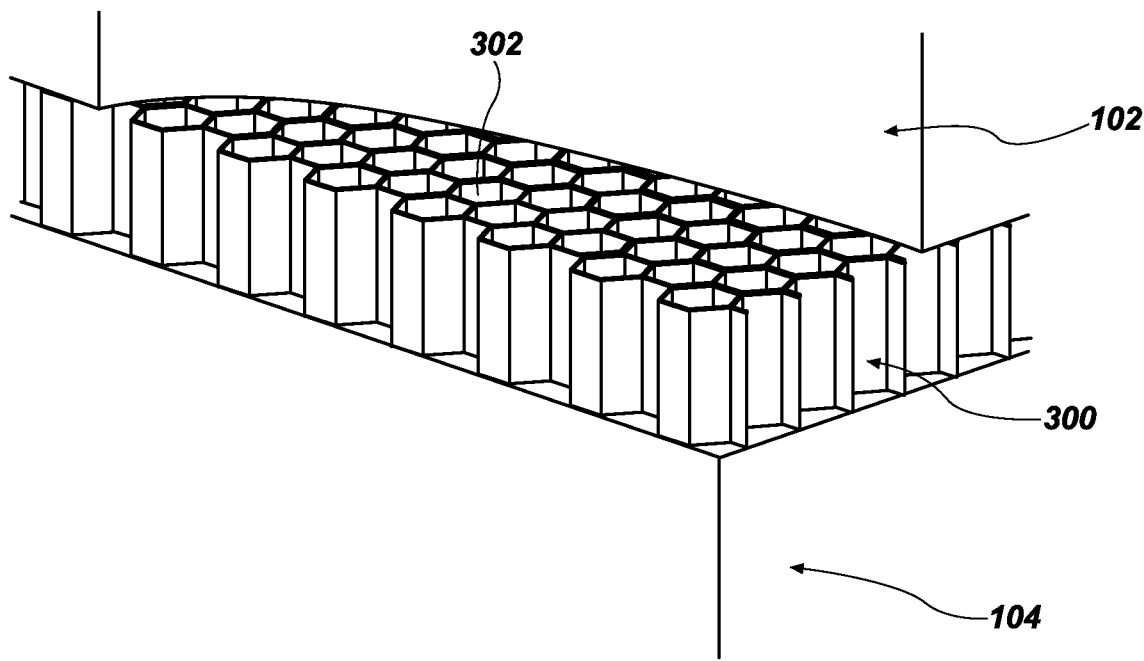
FIG. 3 illustrates a side view of a crush insert in accordance with embodiments of the present disclosure.

FIG. 3 illustrates the crush insert 300 that may be positioned in the joints 106 between segments 102, 104 according to embodiments of the disclosure. The crush insert 300 may be configured to deform under the load associated with thermal expansion of the segments 102, 104 during curing of the composite structure. Deforming the crush insert 300 may absorb forces that otherwise would act against the composite structure while the composite structure is curing. By absorbing the forces, the crush insert 300 may substantially reduce the deformation and/or degradation of the associated segments 102, 104, such that the segments 102, 104 may be reused with little to no repairs between uses. In some embodiments, the crush insert 300 may deform at a constant rate for a given load. In some cases, the crush insert 300 may be "pre-crushed" to enable the crush insert 300 to deform at a constant rate. In other embodiments, the crush insert 300 may crush at a non-constant rate under the load exerted by the thermal expansion.

The crush insert 300 may be a structure including voids 302 within the structure that allow the structure to collapse on itself (e.g., deform) under a load. For example, the crush insert 300 may be formed from an aluminum honeycomb structure, such as PACL-XR1 sold by PLASCORE® located in Michigan. In other embodiments, the crush insert 300 may be formed through an additive manufacturing process or 3-D printing process, such as fused filament fabrication (FFF), large scale additive manufacturing (LSAM), stereolithography (SLA), digital light processing (DLP), multijet fusion (MJF), polyjet, selective laser sintering (SLS), direct deposition modeling (DDM), direct metal laser sintering (DMLS), continuous carbon fiber methods, or electron beam melting (EBM). The additive manufacturing process may be used to form a structure including voids 302 within the structure that allow the structure to collapse under a load. Forming the crush insert 300 through the additive manufacturing process may allow the crush insert 300 to be designed with specific crushing characteristics, such as a designed crushing load, a constant crushing rate, a graduated crushing rate (e.g., a crushing rate that changes at different loads or changes during crushing at a given loads), etc. In some embodiments, the crush insert 300 may be formed directly on the segments 102, 104 through an additive manufacturing process. For example, a used crush insert 300 may be removed from the associated segment 102, 104 after each use and a new crush insert 300 may then be formed on the associated segments 102, 104. The crush insert 300 may, alternatively, be repeatedly deformable, such as being configured to be used multiple times before forming an additional crush insert 300 is required.

Disposing a crush insert 300 between each of the segments 102, 104 may enable each segment 102, 104 to individually adjust, expand, and/or incrementally move during a cure process. Allowing each segment 102, 104 to adjust individually may result in greater consistency of the geometry of the mandrel 100 throughout the curing process.

The mandrel 100 may be assembled by securing each segment 102, 104 to the support shaft 202, through at least one of an interface between the alignment features 110 and complementary alignment features 204 or an interface between adjacent segments 102, 104.

Figure 4:
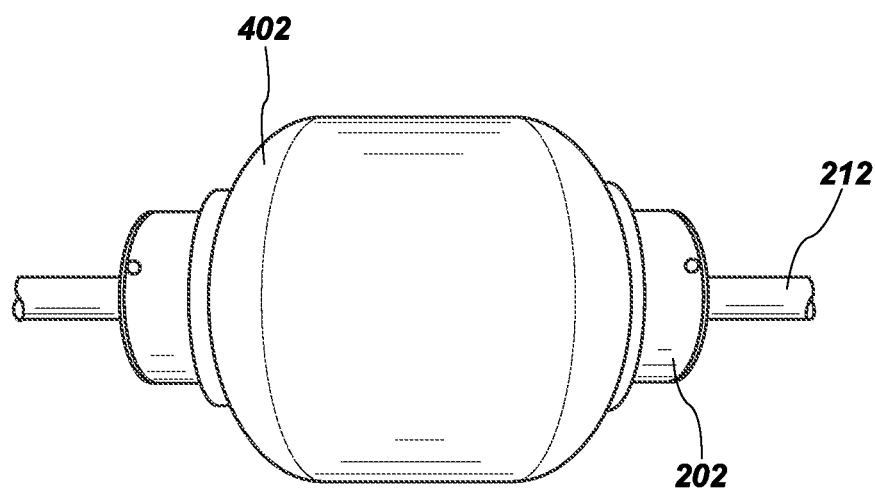
FIGS. 4-8 illustrate process acts for forming a composite structure over the mandrel of the embodiments illustrated in FIGS. 1 and 2.

After the mandrel 100 is assembled, the mandrel 100 may be coupled to a winding tool through the drive shaft 212. A layer of insulation 402 may be formed over the mandrel 100 as illustrated in FIG. 4. The insulation 402 may be a rubber material. The insulation 402 may be applied in sheets of material up to about 0.1 inches (about 2.54 mm) thick. After one or more layers of insulation 402 are applied over the mandrel 100, a portion of the insulation 402 may be removed, such as through sanding or machining until a desired thickness of insulation 402 is reached. The desired thickness of insulation 402 may be between about 0.06 in (about 1.52 mm) and about 0.45 in (about 11.43 mm).

In some embodiments, a layer of polytetrafluoroethylene (PTFE) (e.g., TEFLON®) may be formed over the mandrel 100 before the insulation 402, such that the layer of PTFE may be between the insulation 402 and the mandrel 100 and facilitate release of the composite structure from the mandrel 100 after curing.

Figure 5:
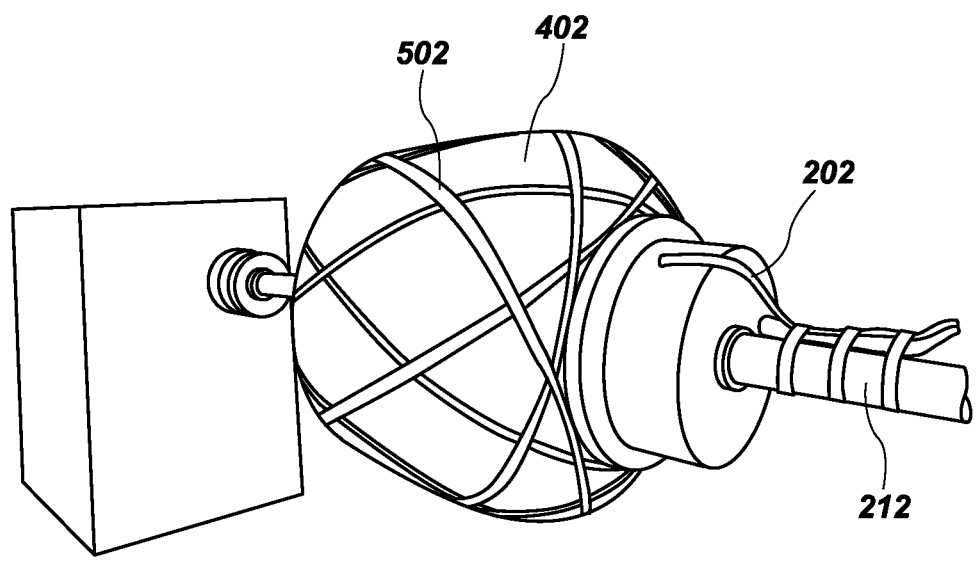

After the insulation 402 is applied, filaments of fiber 502 may be applied over the insulation 402 through a filament winding process as illustrated in FIG. 5. The fiber 502 may be wound in different configurations for different layers to provide strength in different directions. For example, the fiber 502 may be wound in a helical configuration as illustrated in FIG. 5. In the helical configuration the fiber 502 may be wound at an angle of between about 10° and about 40°, such as between about 20° and about 30°, or about 27° relative to a longitudinal axis of the mandrel 100. In other layers, the fiber 502 may be wound in a hoop configuration. In the hoop configuration the fiber 502 may be wound at an angle of between about 80° and about 90°, such as between about 85° and about 90°, or between about 89.5° and about 90°. The winding angles may be controlled by the drive shaft 212. For example, the drive shaft 212 may change an angle of the mandrel 100 relative to the winding tool as described above. In other embodiments, the winding angles may be controlled by changing a position of a winding head relative to the mandrel 100.

Figure 6:
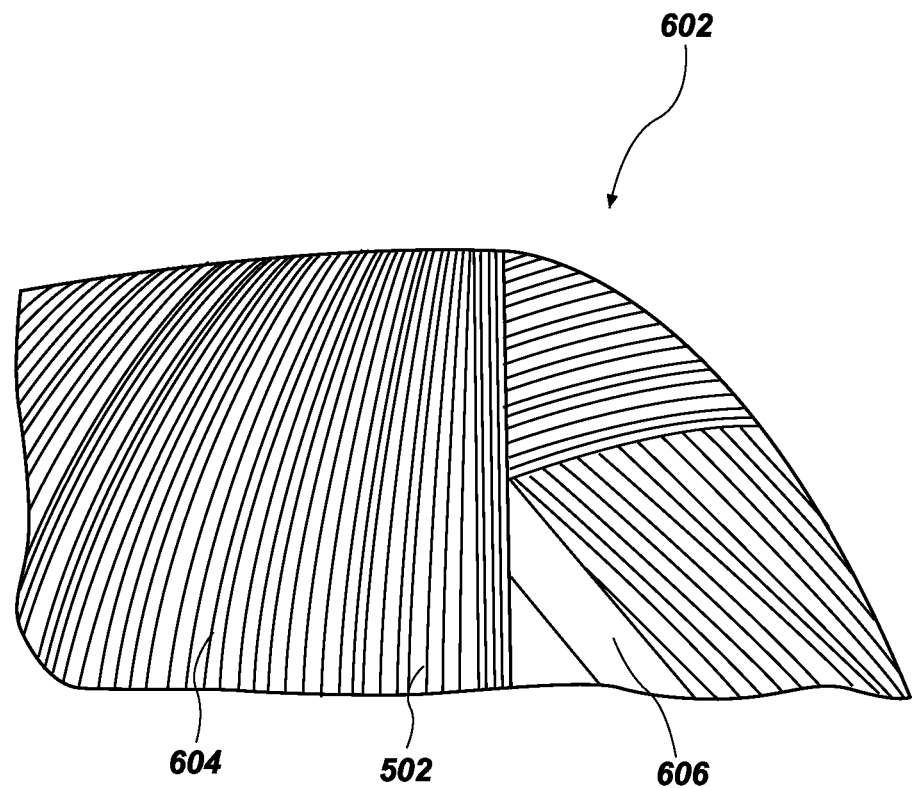

FIG. 6 illustrates a surface of a composite structure 602 after multiple layers of fiber 502 have been wound. As described above, the fiber 502 may be wound at different angles. For example, the fiber 502 may be wound in a hoop winding 604 as illustrated in FIG. 6 or a helical winding 606 as illustrated in FIG. 5 and FIG. 6. The different angles of winding may add strength to the composite structure 602 in different directions. For example, the hoop winding 604 may increase the radial strength of the composite structure 602, whereas the helical winding 606 may increase the longitudinal strength of the composite structure 602.

Each layer of fiber 502 may have a thickness of between about 0.0063 in (about 0.16 mm) and about 0.0144 in (0.366 mm). The composite structure 602 may be formed from between about 1 layer and about 30 layers, such as between about 10 layers and about 20 layers, or about 16 layers.

Figure 7:
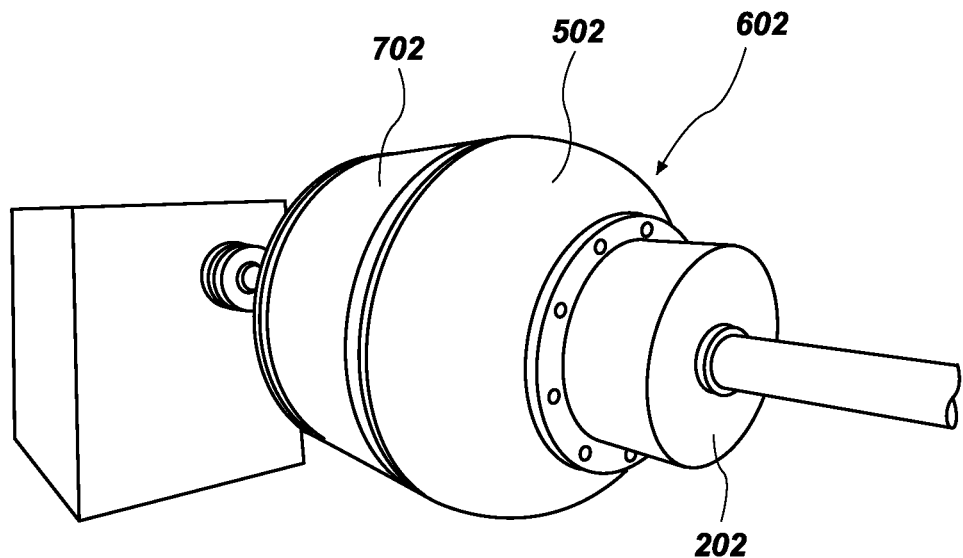

After the composite structure 602 is formed from multiple layers of fiber 502, an outer layer 702 may be formed over the composite structure 602 as illustrated in FIG. 7. The outer layer 702 may be formed from a protective material, such as PTFE/Fiberglass (ARMALON™).

After the composite structure 602 is formed, the composite structure 602 may be cured at a high temperature and/or high pressure. For example, the composite structure 602 on the mandrel 100 may be placed in a high temperature chamber, such as an oven or autoclave, for a specified amount of time. For example, the oven or autoclave containing the composite structure 602 may be maintained at a temperature of between about 120° F. (about 48.89° C.) and about 400° F. (about 204.4° C.) for several hours, such as between about 4 hours and about 20 hours.

In some embodiments, the composite structure 602 may be cured in several stages at different temperatures for different time periods. For example, the composite structure 602 may first be cured at a lower temperature, such as between about 120° F. (about 48.89° C.) and about 280° F. (about 137.78° C.), or about 250° F. (about 121.11° C.) for between about 4 hours and about 10 hours, such as about 8 hours. The composite structure 602 may then be cured at a higher temperature, such as between about 280° F. (about 137.78° C.) and about 350° F. (about 176.67° C.), or about 290° F. (about 143.3° C.) for between about 4 hours and about 14 hours, such as about 10 hours. Between the curing times the temperature may be gradually raised and/or lowered to temperatures above or below the curing temperatures. After the curing time(s) the temperature may be slowly lowered until the composite structure 602 may be removed from the chamber. For example, the temperatures may be changed at a rate ranging from about 0.1° F./minute (0.056° C./minute) to about 5° F./minute (2.778° C./minute), such as in a range from about 0.1° F./minute (0.056° C./minute) to about 2.25° F./minute (1.25° C./minute).

Figure 8:
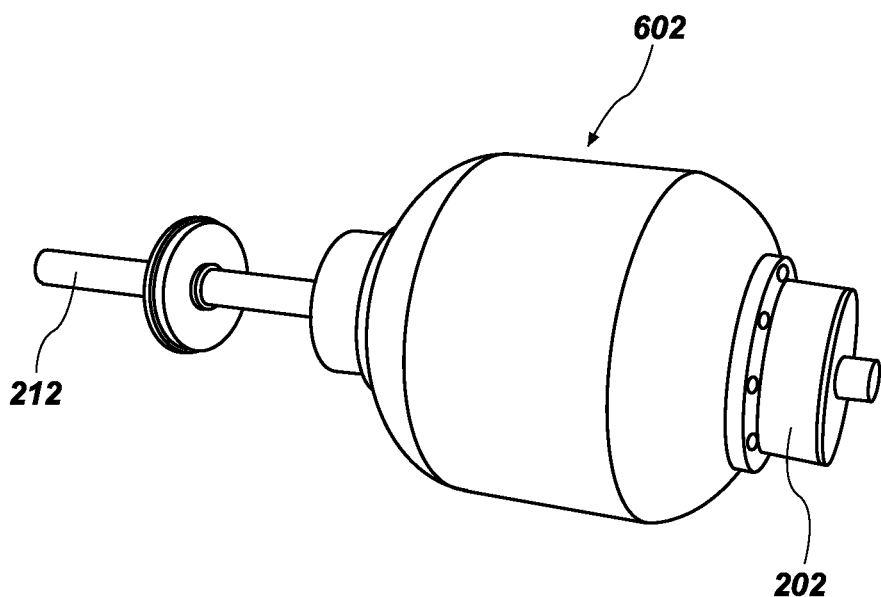
Figure 9:
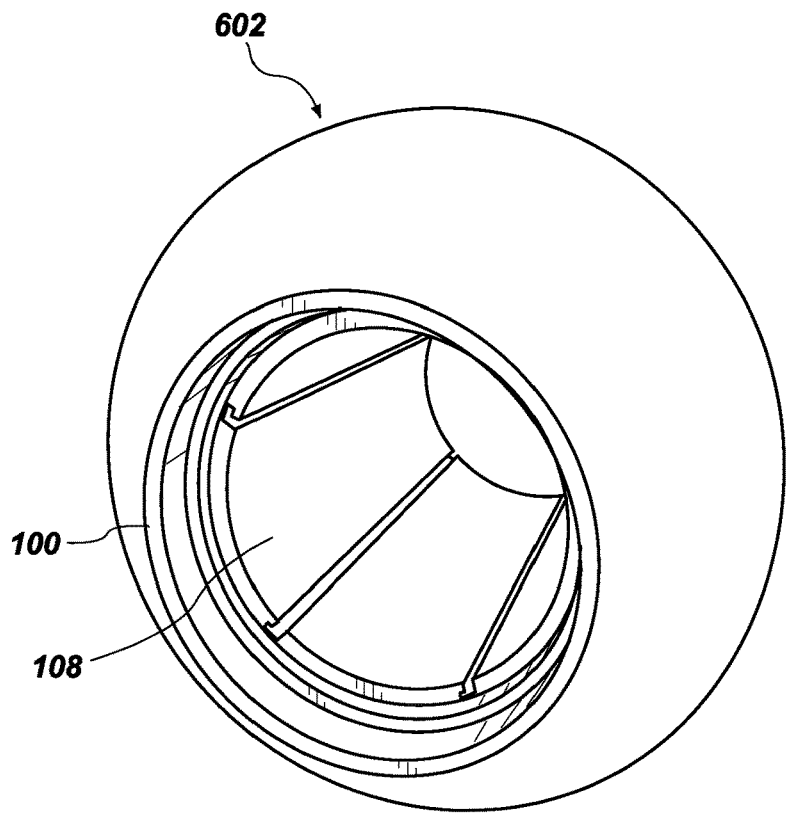
FIGS. 9-11 illustrate process acts for removing the mandrel from the composite structure formed in the process acts illustrated in FIGS. 4-8.
Figure 10:
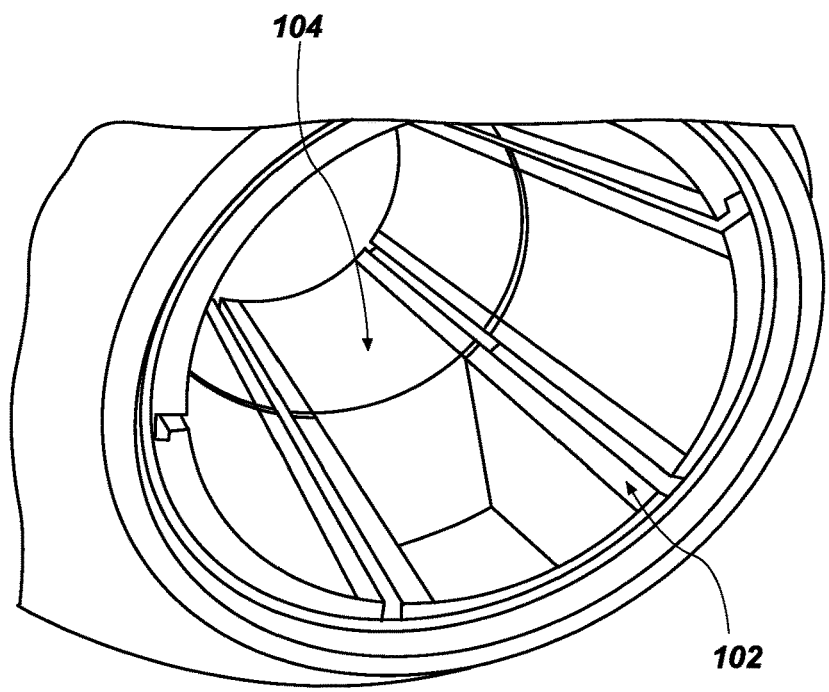
Figure 11:
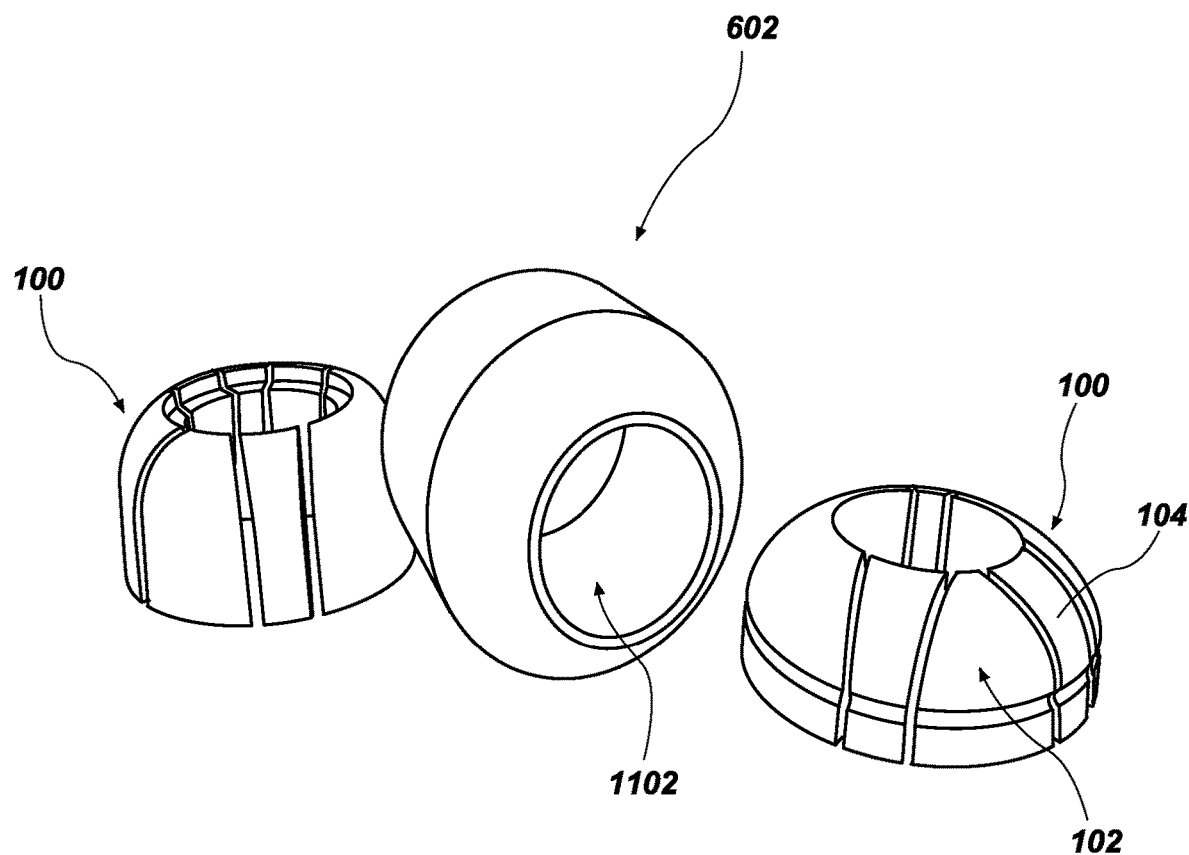

FIG. 8 illustrates the composite structure 602 after the curing process with the composite structure 602 still coupled to the support shaft 202 and the drive shaft 212. The support shaft 202 and drive shaft 212 may be removed from the bore 108 leaving the mandrel 100 within the composite structure 602, as illustrated in FIG. 9. The individual connecting segments 104 and wedge segments 102 of the mandrel 100 may then be removed from the composite structure 602 as illustrated in FIG. 10 and FIG. 11. For example, a first connecting segment 104 may be removed, as illustrated in FIG. 10. The shape of the wedge segments 102 may allow the connecting segment 104 positioned between two wedge segments 102 to move radially relative to the wedge segments 102 in a direction toward an axis of the mandrel 100 while substantially preventing radial movement away from the axis of the mandrel 100. Thus, when the support shaft 202 is removed from the bore 108, the connecting segment 104 may be removed by moving the connecting segment 104 radially into the bore 108. With the first connecting segment 104 removed, the adjoining wedge segments 102 may then be removed through the bore 108. Similarly, the other connecting segments 104 and wedge segments 102 may also be removed through the bore 108 until each segment 102, 104 of the mandrel has been removed from the composite structure 602.

FIG. 11 illustrates the composite structure 602 and the mandrel 100 after all of the segments 102, 104 and the crush inserts 300 have been removed. The composite structure 602 may include a cavity 1102 having substantially the same geometry as the mandrel 100. The segments 102, 104 of the mandrel 100 may each have substantially the same shape after the winding and curing processes as before when the mandrel 100 was assembled, such that the segments 102, 104 may be reassembled with new crush inserts 300 to form another mandrel 100 for forming another composite structure 602 without the need to form an all new mandrel 100. The support shaft 202 and the associated complementary alignment features 204, alignment support 206, etc., may also be reused with the new mandrel 100.

Embodiments of the present disclosure may enable a reusable mandrel to be formed faster and at a reduced cost to traditional (e.g., conventional) metal mandrels. Reducing the cost and time necessary to form a mandrel may enable greater amounts of innovation for composite structures by reducing the time and cost for changing and/or testing different designs. Similarly, reducing time and cost may speed production and reduce the costs to end users of the composite structures.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A method of forming a mandrel for forming a composite structure comprising:
   forming two or more segments of the mandrel from a polymer material through an additive manufacturing process;
   assembling the two or more segments of the mandrel relative to one another;
   removably securing the two or more segments of the mandrel to a support shaft through complementary alignment structures; and
   positioning a crush insert between adjacent segments.

2. The method of claim 1, wherein the additive manufacturing process comprises at least one of a fused filament fabrication process or a large scale additive manufacturing process.

3. The method of claim 1, further comprising forming the crush insert through an additive manufacturing process.

4. The method of claim 1, further comprising forming the crush insert of a material at least one of configured or formulated to deform under a load exerted by thermal expansion of the two or more segments of the mandrel during a composite curing process.

5. The method of claim 1, further comprising configuring the two or more segments of the mandrel to comprise at least two wedge segments and at least one connecting segment.

6. The method of claim 5, wherein assembling the two or more segments relative to one another comprises securing the at least two wedge segments to a support shaft and positioning the at least one connecting segment between the at least two wedge segments.

7. The method of claim 6, wherein the at least two wedge segments are configured to substantially prevent the at least one connecting segment from moving radially away from an axis of the mandrel and the support shaft is configured to substantially prevent the at least one connecting segment from moving radially toward the axis of the mandrel.

8. A tool for forming a composite structure, the tool comprising:
   two or more segments formed from a polymer material;
   a crush insert disposed between the two or more segments; and
   a support shaft removably coupled between the two or more segments through complementary alignment structures.

9. The tool of claim 8, wherein the crush insert is configured to deform under a load exerted by thermal expansion of a composite structure during a curing process.

10. The tool of claim 8, wherein the crush insert comprises aluminum honeycomb.

11. The tool of claim 8, wherein the two or more segments comprises a wedge segment, a straight segment, or a combination thereof.

12. The tool of claim 8, wherein the two or more segments are formed from a polyetherimide material.

13. A method of fabricating a composite structure, the method comprising:
   assembling a mandrel comprising:
      forming two or more segments of the mandrel from a polymer material through an additive manufacturing process;
      assembling the segments relative to one another;
      positioning a crush insert between each of the segments; and
      removably coupling the segments to a support shaft through complementary alignment structures;
   coupling the support shaft to a winding machine;
   winding composite fibers around the mandrel to form the composite structure;
   heating the composite structure; and
   separating the mandrel from the composite structure.

14. The method of claim 13, wherein separating the mandrel from the composite structure comprises disassembling the two or more segments of the mandrel.

15. The method of claim 14, further comprising using a crush insert configured to deform to absorb thermal expansion of the two or more segments of the mandrel when heating the composite structure.

16. The method of claim 13, wherein the two or more segments of the mandrel comprise at least two wedge segments and at least one connecting segment and assembling the two or more segments relative to one another comprises positioning the at least one connecting segment between the at least two wedge segments.

17. The method of claim 16, wherein separating the mandrel from the composite structure comprises removing the at least one connecting segment from between the at least two wedge segments before removing the at least two wedge segments.

18. The tool of claim 8, wherein the two or more segments are configured to be individually removed by moving radially inward after the support shaft is removed.

* * * * *